US010776051B2

(12) United States Patent
Tsai et al.

(10) Patent No.: US 10,776,051 B2
(45) Date of Patent: Sep. 15, 2020

(54) MEMORY SHARING DUAL-MODE NETWORK COMMUNICATION DEVICE

(71) Applicant: REALTEK SEMICONDUCTOR CORP., Hsinchu (TW)

(72) Inventors: Ming-Tsung Tsai, Taoyuan (TW); Chiu-Yun Tsai, Hsinchu (TW); Chien-Lien Peng, Hsinchu County (TW); Fu-Ching Hsu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 6 days.

(21) Appl. No.: 16/411,454

(22) Filed: May 14, 2019

(65) Prior Publication Data

US 2020/0210109 A1    Jul. 2, 2020

(30) Foreign Application Priority Data

Dec. 28, 2018  (TW) .............................. 107147681 A

(51) Int. Cl.
*G06F 3/06* (2006.01)
*H04Q 11/00* (2006.01)

(52) U.S. Cl.
CPC .......... *G06F 3/0659* (2013.01); *G06F 3/0604* (2013.01); *G06F 3/0688* (2013.01); *H04Q 11/0067* (2013.01); *H04Q 2011/0064* (2013.01)

(58) Field of Classification Search
CPC .... G06F 3/0659; G06F 3/0604; G06F 3/0688; H04Q 11/0067; H04Q 2011/0064
See application file for complete search history.

(56) References Cited

U.S. PATENT DOCUMENTS 8,634,431 B1 * 1/2014 Chiang ............... H04L 49/9005
370/412
2007/0070997 A1 * 3/2007 Weitz ................. H04L 49/9073
370/389

FOREIGN PATENT DOCUMENTS

CN          207251829 U  *  4/2018

* cited by examiner

*Primary Examiner* — Tasnima Matin
(74) *Attorney, Agent, or Firm* — Li & Cai Intellectual Property (USA) Office

(57) ABSTRACT

A memory sharing dual-mode network communication device includes a first memory, an OTT module and a PON module. The first memory is divided into an OTT region and a PON region, and the OTT module is used to obtain an OTT service, which includes an OTT processor, a memory arbitration circuit, a first memory main controller, a bridge circuit, and a memory slave controller. The PON module includes a PON processor and a second memory main controller. The memory arbitration circuit is configured to respond to a first access request from the OTT processor or a second access request of the PON processor to access the OTT area or the PON area of the first memory through the first memory host controller, and the memory arbitration circuit further determines the priority order of the first access request and the second access request.

14 Claims, 4 Drawing Sheets

MEMORY SHARING DUAL-MODE NETWORK COMMUNICATION DEVICE

CROSS-REFERENCE TO RELATED PATENT APPLICATION

This application claims the benefit of priority to Taiwan Patent Application No. 107147681, filed on Dec. 28, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a network communication device, and more particularly to a memory sharing dual-mode network communication device.

BACKGROUND OF THE DISCLOSURE

The existing Over-The-Top (OTT) audio and video equipment needs to be combined with a router, a switcher or a passive optical network (PON), so as to achieve a multi-functional set-top box while serving as home audio and video communication integration equipment. In other words, if PON services are provided in user's home, the network and OTT services can be simultaneously accessed by integrating the OTT device with the PON device.

The existing OTT and PON integration devices each use two individual systems on chips (SOCs), each of the OTT and PON integration devices executes a corresponding operating system, and independently uses a respective flash storage device. In other industries, the proprietary interface of the non-flash booting interface (NFBI) is also used to borrow the built-in flash memory. However, the proprietary interface can operate as being supported by both of the OTT and PON devices in the OTT and PON integration device.

The existing OTT device and the PON device each use an embedded multimedia media card (eMMC) or a NAND type flash memory, and therefore, two flash memory control chips are required. If the OTT device and the PON device use chips provided by the same company and have an exclusive proprietary interface, the proprietary interface will be incompatible with the flash memory control chip available in the market, and is also difficult to achieve the same speed with conventional flash memory control chips. In addition, once the OTT device is turned off, the PON device will be unusable, which is opposite to that the PON devices are maintained to be in operation constantly for networking.

Therefore, how the circuit can be improve to overcome the above-mentioned defects by integrating the PON and OTT in a simple manner has become one of the important issues to be solved in the field.

SUMMARY OF THE DISCLOSURE

In response to the above-referenced technical inadequacies, the present disclosure provides a memory sharing dual-mode network communication device, and the OTT module can be docked by using the original memory interface of the PON module without using a special memory interface supported by both of ICs of OTT and PON modules to achieve a flash memory sharing mechanism.

In one aspect, the present disclosure provides a memory sharing dual-mode network communication device, which includes a first memory, an OTT module and a PON module. The first memory is divided into an OTT region and a PON region, and the OTT module is used to obtain an OTT service, which includes an OTT processor, a memory arbitration circuit, a first memory main controller, a bridge circuit, and a memory slave controller. The memory arbitration circuit is coupled to the OTT processor, and the first memory main controller is coupled to the memory arbitration circuit and coupled to the first memory through the first memory interface. The bridge circuit is coupled to the memory arbitration circuit, and the memory slave controller is coupled to the bridge circuit. The PON module is coupled to a fiber optic network and includes a PON processor and a second memory main controller. The second memory main controller is coupled to the PON processor and coupled to the memory slave controller through the second memory interface. The memory arbitration circuit is configured to respond to a first access request from the OTT processor or a second access request of the PON processor to access the OTT area or the PON area of the first memory through the first memory host controller, and the memory arbitration circuit further determines the priority order of the first access request and the second access request according to operating states of the OTT module and the PON module.

One of the beneficial effects of the present application is that the memory sharing dual-mode network communication device provided by the present disclosure can be docked with the OTT module by using the original memory interface of the PON module without using a special memory interface supported by both of ICs of OTT and PON modules to achieve a flash memory sharing mechanism.

One of the beneficial effects of the present disclosure is that the memory sharing dual-mode network communication device provided by the present disclosure can set the memory controller, the memory arbitration circuit, the bridge circuit and the memory slave controller in the OTT module in an uninterrupted power zone, the PON module can still access normally when the OTT processor enters a power saving mode, such as a sleep mode or a low-power mode.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
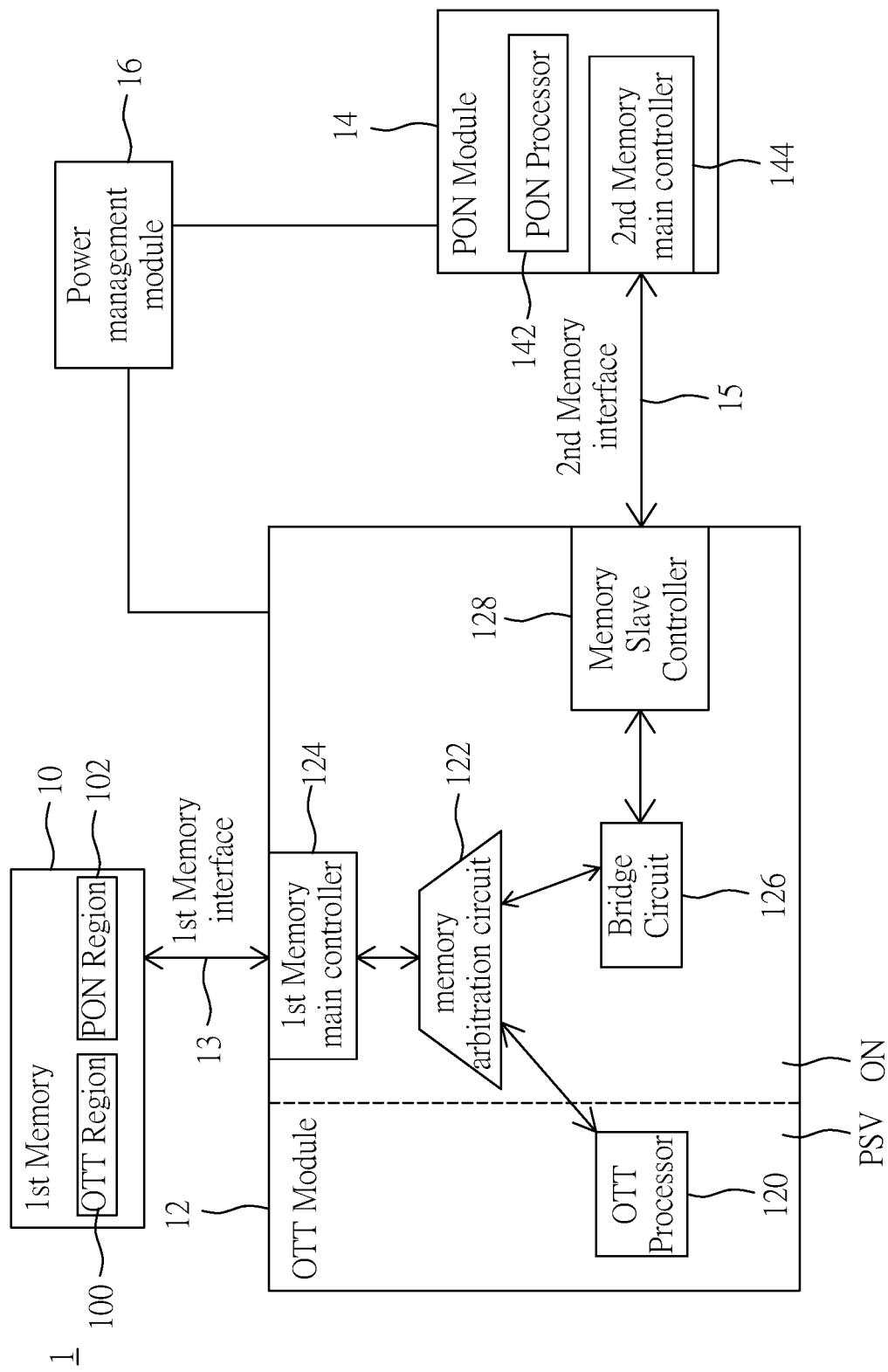
FIG. 1 is a block diagram of a memory sharing dual-mode network communication device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the "memory sharing dual-mode network communication device" disclosed in the present disclosure are described below by way of specific embodiments, and those skilled in the art can understand the advantages and effects of the present disclosure from the contents disclosed in the present specification. The present application can be implemented or applied in various other specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, although the terms "first," "second," "third," and the like may be used herein to describe various elements or signals, these elements or signals are not limited by these terms. These terms are primarily used to distinguish one element from another, or one signal from another. In addition, the term "or" as used herein may include a combination of any one or more of the associated listed items, depending on the actual situation.

First Embodiment

Reference is made to FIG. 1, which is a block diagram of a memory sharing dual-mode network communication device according to a first embodiment of the present disclosure. The first embodiment of the present disclosure provides a memory sharing dual-mode network communication device 1, which includes a first memory 10, an OTT module 12, a PON module 14, and a power management module 16. The first memory 10 is divided into an over-the-top (OTT) region 100 and a passive optical network (PON) region 102 for being used by the OTT module 12 and the PON module 14, respectively. The OTT module 12 can be used in a TV set box or an OTT TV box to connect with a cloud server to obtain an OTT service, so that a user can watch a digital TV program. On the other hand, the passive optical network (PON) module 10 can be used to provide optical fiber communication networks to users. For the most fiber-to-the-home technology that is currently being noticed by telecom operators, the advantage lies in considerable construction flexibility and construction cost advantage. A typical PON system utilizes split-wave multiplexing technology to transmit uplink and downlink signals. The downlink traffic is transmitted to each optical network units (ONU) in a broadcast mode. In an uplink direction, Time-Division Multiple-Access (TDMA) or Wave-Division Multiple-Access (WDMA) is used as a multiple access mechanism for the ONU on a client terminal.

In detail, the main purpose of the present disclosure is to save the material cost required for the hardware of the electronic product. Currently, in the existing industry, the PON and OTT use their own flash memory, and the PON uses NAND flash memories with small-capacity serial/parallel transmission specifications, e.g., SLC NAND flash memory with a capacity of approximately 128 MB or 256 MB, which costs between $1.x and $2.x. On the other hand, most of the existing OTT modules use large-capacity eMMC or MLC NAND flash memory, and the flash memory currently used are mainly with 8 GB capacity. However, the demand on an operating system of an OTT terminal, such as the Android system, is much smaller than a storage capacity used, and a considerable amount of flash memory space is still available. Therefore, in the present disclosure, the flash memory is divided into the OTT region 100 and the PON region 102, so as to reserve a part of an operation space of the OTT terminal for the PON terminal, thereby saving the memory setting cost of the PON terminal.

Further, in the embodiment, the OTT module 12 includes an OTT processor 120, a memory arbitration circuit 122, a first memory main controller 124, a bridge circuit 126, and a memory slave controller 128. The memory arbitration circuit 122 is coupled to the OTT processor 120, the first memory host controller 124 is coupled to the memory arbitration circuit 122, and coupled to the first memory 10 through a first memory interface 13. The bridge circuit 126 is coupled to the memory arbitration circuit 122, and the memory slave controller 128 is coupled to the bridge circuit 128.

The passive optical network (PON) module 14 is operatively coupled to a fiber optic network and includes a PON processor 142 and a second memory main controller 144. The second memory main controller 144 is coupled to the PON processor 142 and coupled to the memory slave controller 128 via the second memory interface 15.

For example, the first memory main controller 124, the memory slave controller 128, and the second memory main controller 144 can be bus circuit controllers for managing and planning transmission speeds among the first memory 10, the OTT processor 120, and the PON processor 142, which can be a single chip or integrated into a related large chip, such as a microprocessor and a Northbridge built-in memory controller.

Here, a configuration of the memory arbitration circuit 122, the bridge circuit 126, and the memory slave controller 128 is mainly used to simulate a flash memory suitable for the interface according to the second memory interface 15, so that the PON module can continuously use an original memory interface of the PON module 14 to be docked with the OTT module 12, and the ICs of the OTT module 12 and the PON module 14 are not required to support a special memory interface.

Here, the memory arbitration circuit 122 can be configured to respond to a first access request from the OTT processor 120 or a second access request from the PON processor 14 to access the OTT region 100 or PON region 102 of the first memory 10 through the first memory host controller 124. In addition, if the first access request of the OTT processor 120 and the second access request of the PON processor 14 are simultaneously generated, the memory arbitration circuit 122 can further determine, according to operating states of the OTT module 12 and the PON module 14, a priority order of the first access request and the second access request. By using the original memory interface of the PON module, the OTT module can be docked without using a special memory interface supported by both of ICs of OTT and PON modules to achieve a flash memory sharing mechanism.

Furthermore, for meeting the characteristic that the PON devices are maintained constant operation for continuous networking, the memory sharing dual-mode network communication device 1 further includes the power management module 16 for connecting the OTT module 12 and the PON module 14, respectively. In addition to providing power for the OTT module 12 and the PON module 14, the power management module 16 further provides an uninterrupted zone ON and a power-saving area PSV in the OTT module 12. The OTT processor 120 is disposed in the power-saving zone PSV, and the first memory main controller 124, the memory arbitration circuit 122, a bridge circuit 126, and the memory slave controller 128 are disposed in the uninterrupted zone ON. When the OTT processor 120 enters a power saving mode, the first memory main controller 124, the memory arbitration circuit 122, the bridge circuit 126, and the memory slave controller 128 still maintain normal operation, and the PON module 14 can access the PON region 102 in the first memory 10.

Therefore, by setting the memory controller, the memory arbitration circuit, the bridge circuit and the memory slave controller in the OTT module in the uninterrupted power zone, the PON module can still be accessed when the OTT processor enters the power saving mode, such as a sleep mode or a low-power mode.

However, since the first memory interface 13 and the second memory interface 15 may be the same or different, corresponding to the two cases, different bridge circuits 126 are required, which will be described in detail below.

Second Embodiment

Figure 2:
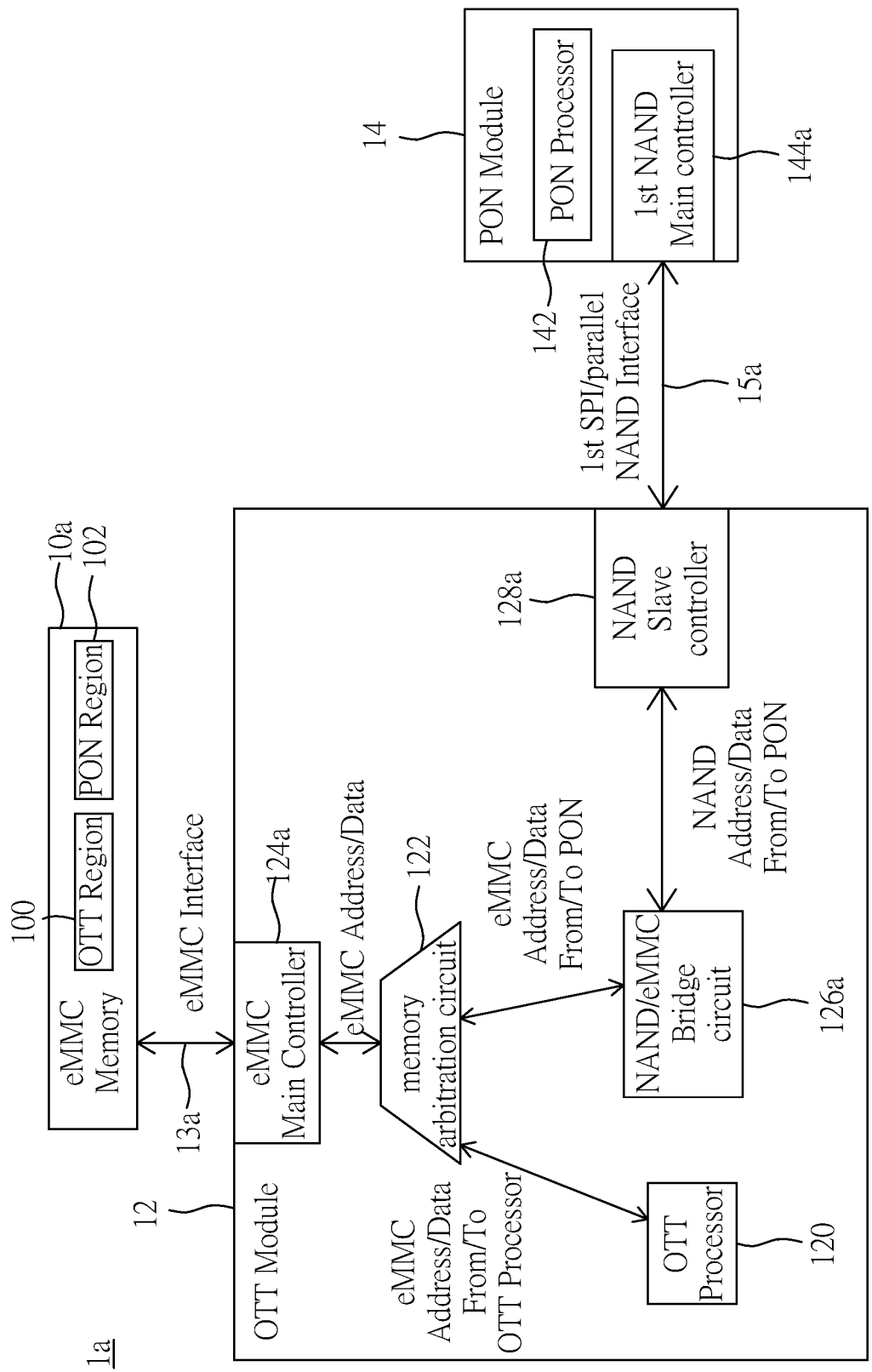
FIG. 2 is a block diagram of a memory sharing dual-mode network communication device according to a second embodiment of the present disclosure.

Reference is made to FIG. 2, which is a block diagram of a memory sharing dual-mode network communication device according to a second embodiment of the present disclosure. The second embodiment of the present application provides a memory sharing dual-mode network communication device 1a, which includes an eMMC memory 10a, an OTT module 12, and a PON module 14. In the present embodiment, like elements are denoted by like reference numerals and will not be described again. The OTT module 12 includes an OTT processor 120, a memory arbitration circuit 122, an eMMC main controller 124a, an NAND/eMMC bridge circuit 126a, and a NAND slave controller 128a. The memory arbitration circuit 122 is coupled to the OTT processor 120, and the eMMC main controller 124a is coupled to the memory arbitration circuit 122 and coupled to the eMMC memory 10a via an eMMC interface 13. The NAND/eMMC bridge circuit 126a is coupled to the memory arbitration circuit 122, and the NAND slave controller 128a is coupled to the NAND/eMMC bridge circuit 126a.

The PON module 14 includes a PON processor 142 and a first NAND main controller 144a. The first NAND main controller 144a is coupled to the PON processor 142 and coupled to the NAND slave controller 128a via a first SPI/parallel NAND interface 15a.

In this embodiment, as for the main architecture of the first embodiment, the first memory interface is different from the second memory interface. Therefore, when the memory arbitration circuit 122 responds to the second access request from the PON module 14 to allow the PON module 14 can access the PON region, the bridge circuit is configured to convert address and data signals for accessing the first memory between the first signal specification applicable to the first memory interface and the second signal specifications applicable to the second memory interface. In this embodiment, the NAND address and data from the PON module 12 need to be converted into eMMC address and data by the NAND/eMMC bridge circuit 126a, so that the eMMC main controller 124a can access, based on the eMMC addressing and data from the PON module 12, the eMMC memory 10a through the eMMC interface 13a.

Similarly, when the eMMC main controller 124a transmits the eMMC address and data to the PON module 14 through the memory arbitration circuit 122, the eMMC address and data need to be converted to the NAND addressing and data transmitted to the PON module 12 by the NAND/eMMC bridge circuit 126a, and the NAND slave controller 128a can transmit, according to the NAND address and data transmitted to the PON module 12, to the PON module through the first SPI/parallel NAND interface 15a to complete the access from the PON module 12 to the eMMC memory 10a.

Figure 3:
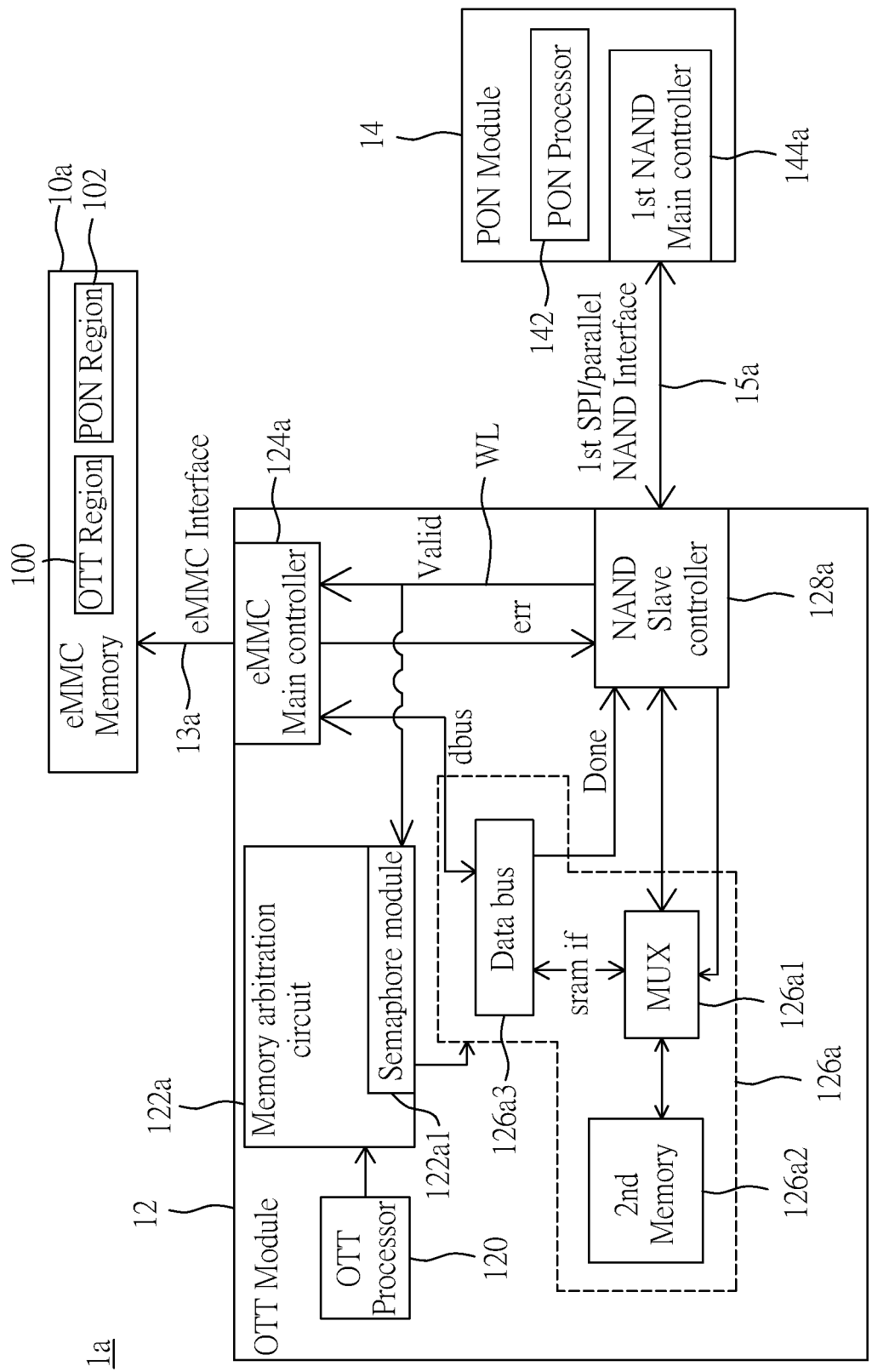
FIG. 3 is another block diagram of the memory sharing dual-mode network communication device according to the second embodiment of the present disclosure.

Reference is further made to FIG. 3, which is another block diagram of the memory sharing dual-mode network communication device according to the second embodiment of the present disclosure. As shown in FIG. 3, the bridge circuit 126a includes a multiplexer (MUX) 126a1, a second memory 126a2, a data bus 126a3, and a confirmation signal line WL. The multiplexer 126a1 is coupled to the NAND slave controller 128a. The second memory 126a2 is coupled to the multiplexer 126a1. The data bus 126a3 is coupled to the multiplexer 126a1, the NAND slave controller 128a, and the eMMC master controller 124a. The confirmation signal line WL is coupled to the memory arbitration circuit 122a, the eMMC main controller 124a, and the NAND slave controller 128a. The second memory 126a2 may be a random access memory, such as a static random access memory (SRAM), a dynamic random access memory (DRAM), or the like. The second memory 126a2 is used to store a descriptor required by the PON module 14 to execute a program.

On the other hand, the memory arbitration circuit 122a of the embodiment includes a Semaphore module 122a1, and the Semaphore module 122a1 can be a register, which is configured to store a plurality of parameters for determining, according to the operation states of the OTT module 12 and the PON module 14, a priority order of the first access request and the second access request. The Semaphore module 122a1 is further configured to receive, when the PON processor 142 transmits the second access request, a confirmation signal Valid from the NAND slave controller 128a, and determine, according to the operating states of the OTT module 12 and the PON module 14, whether to respond to the confirmation signal Valid to allow the PON module 14 to access the PON region 102.

For the PON module, a program flow thereof includes an erase phase, a program load phase, a program execution phase, and a get feature phase. In the erase phase, the PON module 14 issues an erase command, and the NAND slave controller 128a is notified by the confirmation signal Valid. Until the program flow proceeds to the program loading phase, the PON module 14 writes data into the second memory 126a2 via the multiplexer 126a1 and the NAND slave controller 128a.

During the program execute phase, the NAND slave controller 128a writes the descriptor to the second memory 126a2. At this time, the NAND slave controller 128a receives a program execution command issued by the PON module 14, and then issues a confirmation signal Valid to the eMMC main controller 124a and the Semaphore module 122a1 of the arbitration circuit 122a. Next, the eMMC main controller 124a determines whether the program can be executed by the Semaphore module 122a1. In detail, the eMMC main controller 124a can determine, according to the operating state of the OTT module 12 and the PON module 14, whether the program can be executed. For example, when the system is turned on, the system determines that the network connection capability of the PON needs to be preferentially provided, the PON module 14 will be activated preferentially and a program execution command will be issued. Therefore, the eMMC main controller 124a determines that an initialization program of the PON module 14 to be executed first by the Semaphore module 122a1. The Semaphore module 122a1 can be implemented by a hardware, a firmware or a software, which is not limited herein, and a plurality of parameters for determining the above determinations can also be stored in the Semaphore module 122a1 serving as a register.

After the eMMC main controller 124a determines that, according to the Semaphore module 122a1, the program can be executed, the eMMC main controller 124a obtains the descriptor from the second memory 126a2, for example, through the memory/data bus conversion interface sram if and the data signal dbus to execute the program. Next, the eMMC main controller 124a writes the data from the second memory 126a2 to the eMMC memory 10a. When the program execution is completed, the eMMC main controller 124a transmits a completion signal done to the NAND slave controller 128a. Here, if an error occurs when a program is executed or when data is acquired from the second memory 126a2, the eMMC main controller 124a transmits an error signal err to the NAND slave controller 128a, for example, issuing a high level pulse as an error signal err.

Further, in the get feature phase, the PON module 14 can confirm whether the program execute phase is completed. Therefore, the eMMC main controller 124a replies a current state to the PON module 14 with the data signal dbus and after the PON module 14 confirms that the state is ready, a new command is then issued.

In addition, in a PON read flow for the PON module 14 to the eMMC memory 128, a page read phase, a read status phase, and a read from cache phase can be included. Here, the page read phase is mainly used to cause the PON module 14 to notify the eMMC main controller 124a to transfer data from the eMMC memory 10a to the second memory 126a2. Further, similar to the program execute phase, the PON module 14 issues a page read command, the NAND slave controller 128a writes the descriptor to the second memory 126a2, accordingly, and issues a confirmation signal Valid to the eMMC main controller 124a and the Semaphore module 122a of the memory arbitration circuit 122a. Next, the eMMC main controller 124a determines whether the reading can be performed according to the Semaphore module 122a1. When the eMMC main controller 124a determines that the reading operation of the PON module 14 is executable according to the Semaphore module 122a1, the eMMC main controller 124a obtains the descriptor from the second memory 126a2, for example, through a memory/data bus conversion interface sram if and a data signal dbus to perform the read operation. Next, the eMMC main controller 124a writes the data from the second memory 126a2 to the eMMC memory 10a, and transmits a completion signal done to the NAND slave controller 128a. Here, if a read error occurs or an error occurs when the eMMC main controller 124a acquires data from the second memory 126a2, an error signal err is issued to the NAND slave controller 128a.

Further, in the read status phase, the eMMC main controller 124a replies a current state to the PON module 14 with the data signal dbus, and after the PON module 14 confirms that the state is ready, a new command is then issued. The cache read phase is mainly used for the PON module 14 to notify the NAND slave controller 128a to transfer data to the PON module 14. When the PON module 14 issues a cache read command, the NAND slave controller 128a takes the data from the second memory 126a2 and transmits it to the PON module 14.

In addition, during a reset phase of the PON module 14, the PON module 14 can transmit a reset signal to the eMMC master controller 124a via the NAND slave controller 128a to perform a soft restart procedure.

As described above, the register 122a1 stores a plurality of parameters for determining the priority order of the first access request and the second access request according to the operating states of the OTT module 12 and the PON module 14, for example, a parameter addr offset for determining possessions of proportion of the PON region 102 and the OTT region 100, which defines a block address offset for command queue mode, or a parameter count for determining sizes of a plurality of page addresses of the corresponding PON module 14, a parameter pri for determining a priority of the command queue mode, a parameter len for determining a transmission length, a 4-bit cache read command, and a 4-bit program execution command. The command queue is a queue for enabling command execution in order of priority or delay, and the 4-bit cache read command and the 4-bit program execution command are set for transmitting the data signal dbus with 4-bit between the eMMC master controller 124a and the NAND slave controller 128a, therefore, two additional signals are required with respect to the data signal dbus with 2-bit.

Therefore, when the PON module 14 is integrated with the OTT module 12, the original SPI/parallel NAND interface of the PON module 14 can be continuously used to be docked with the OTT module having the eMMC interface without using a special memory interface supported by both of ICs of OTT and PON modules to achieve a flash memory sharing mechanism.

Third Embodiment

Figure 4:
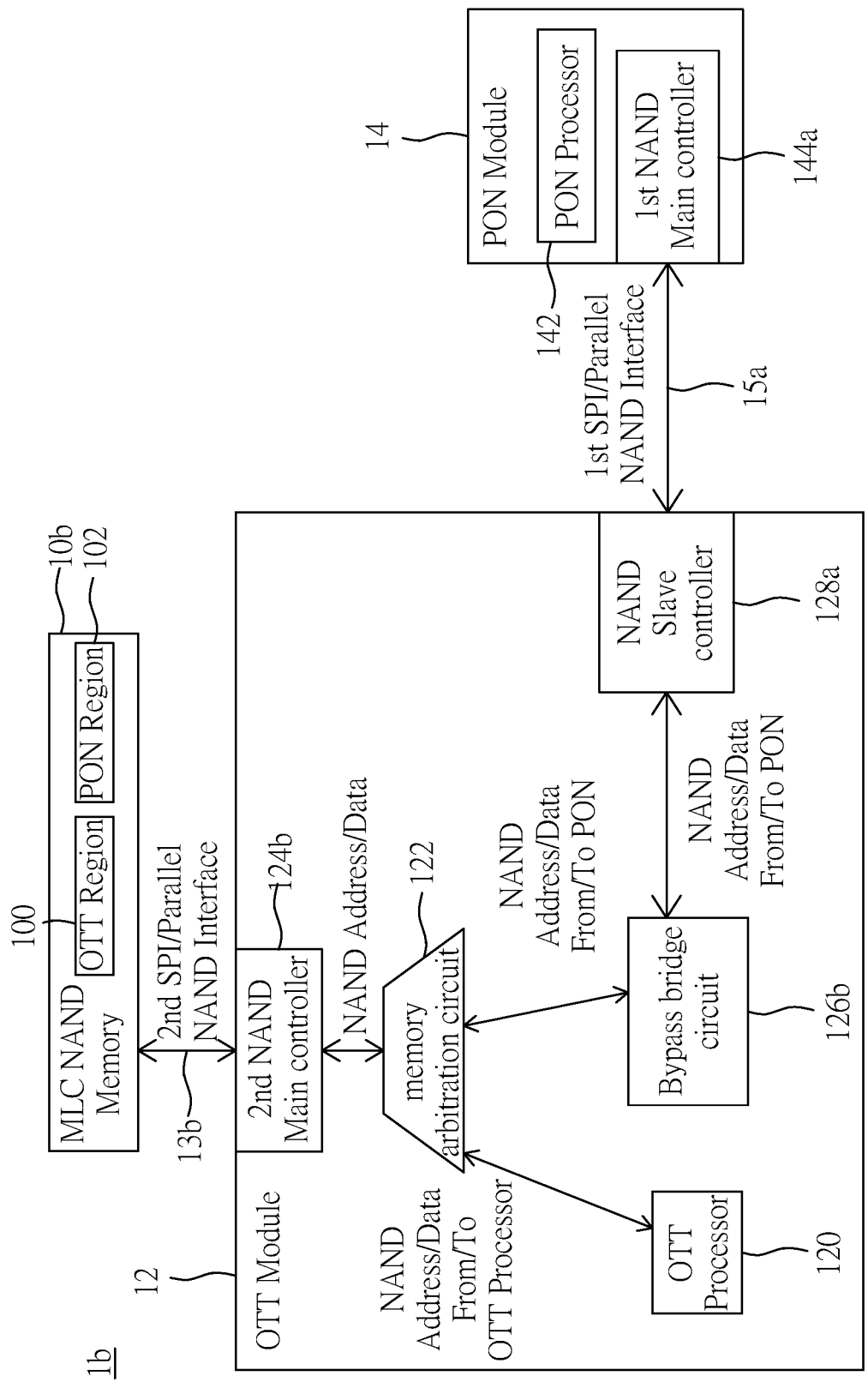
FIG. 4 is a block diagram of a memory sharing dual-mode network communication device according to a third embodiment of the present disclosure.

Reference is made to FIG. 4, which is a block diagram of a memory sharing dual-mode network communication device according to a third embodiment of the present disclosure. The third embodiment of the present disclosure provides a memory sharing dual-mode network communication device 1b, which includes an MLC NAND memory 10b, an OTT module 12, and a PON module 14. In the present embodiment, like elements are denoted by like reference numerals and will not be described again. The OTT module 12 includes an OTT processor 120, a memory arbitration circuit 122, a second NAND main controller 124b, a bypass bridge circuit 126b, and a NAND slave controller 128a. The memory arbitration circuit 122 is coupled to the OTT processor 120. The second NAND controller 124b is coupled to the memory arbitration circuit 122 and coupled to the MLC NAND memory 10b via the second SPI/parallel NAND interface 13b. The bypass bridge circuit 126b is coupled to the memory arbitration circuit 122, and the NAND slave controller 128a is coupled to the NAND/eMMC bridge circuit 126a.

The PON module 14 includes a PON processor 142 and a first NAND main controller 144a. The first NAND main controller 144a is coupled to the PON processor 142 and coupled to the NAND slave controller 128a via a first SPI/parallel NAND interface 15a.

In this embodiment, as for the main architecture of the first embodiment, the first memory interface is the same as the second memory interface. Therefore, when the memory arbitration circuit 122 responds to the second access request from the PON module 14 to allow the PON module 14 to access the PON region, the bridge circuit does not need to convert address and data signals for accessing the first memory between the first signal specification applicable to the first memory interface and the second signal specifications applicable to the second memory interface, and thus the bridge circuit can be directly used as the bypass bridge circuit 126b that provides the transmission path. In this embodiment, since the memory interfaces are the same, the second NAND main controller 124b can directly access, according to the NAND address and data from the PON module 14, the MLC NAND memory 10b through the second SPI/parallel NAND interface 13b.

Similarly, when the second NAND main controller 124b transfers the NAND address and data to the PON module 14 through the memory arbitration circuit 122, the NAND address and data transmitted to the PON module 12 can be directly transferred to the NAND slave controller 128a without conversion. The NAND slave controller 128a can transmit, according to the NAND addressing and data transmitted to the PON module 12, the data to the PON module 14 through the first SPI/parallel NAND interface 15a to complete a data access from the PON module 12 to the eMMC memory 10a.

Therefore, when the PON module 14 is integrated with the OTT module 12, the original SPI/parallel NAND interface of the PON module 14 can be continuously used to be docked with the OTT module having the SPI/parallel NAND interface without using a special memory interface supported by both of ICs of OTT and PON modules to achieve a flash memory sharing mechanism.

Advantageous Effects of Embodiments

One of the beneficial effects of the present invention is that the memory sharing dual-mode network communication device provided by the present disclosure can be docked with the OTT module by using the original memory interface of the PON module without using a special memory interface supported by both of ICs of OTT and PON modules to achieve a flash memory sharing mechanism.

One of the beneficial effects of the present disclosure is that the memory sharing dual-mode network communication device provided by the present disclosure can set the memory controller, the memory arbitration circuit, the bridge circuit and the memory slave controller in the OTT module in an uninterrupted power zone, the PON module can still be accessed normally when the OTT processor enters a power saving mode, such as a sleep mode or a low-power mode.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A memory sharing dual-mode network communication device, comprising:
   a first memory divided into an over-the-top (OTT) region and a passive optical network (PON) region;
   an OTT module, configured to obtain an OTT service, the OTT module including:
     an OTT processor;
     a memory arbitration circuit coupled to the OTT processor;
     a first memory main controller coupled to the memory arbitration circuit and coupled to the first memory through a first memory interface;
     a bridge circuit coupled to the memory arbitration circuit; and
     a memory slave controller coupled to the bridge circuit; and
   a PON module, coupled to a fiber optic network, the PON module includes:
     a PON processor; and
     a second memory main controller coupled to the PON processor and coupled to the memory slave controller via a second memory interface,
   wherein the memory arbitration circuit is configured to access, in response to a first access request from the OTT processor or a second access request from the PON processor, the OTT region or the PON region of the first memory through the first memory main controller, and determine, according to operating states of the OTT module and the PON module, a priority order of the first access request and the second access request.

2. The memory sharing dual-mode network communication device according to claim 1, wherein the first memory interface is different from the second memory interface.

3. The memory sharing dual-mode network communication device according to claim 2, wherein when the memory arbitration circuit is configured to respond to the second access request, the bridge circuit is configured to convert an address and a data signal for accessing the first memory between a first signal specification applicable to the first memory interface and a second signal specification applicable to the second memory interface.

4. The memory sharing dual-mode network communication device according to claim 3, wherein the second memory main controller is a first NAND main controller, the memory slave controller is a NAND slave control, and the first memory main controller is an eMNIC main controller.

5. The memory sharing dual-mode network communication device according to claim 4, wherein the first memory is an eMNIC memory, the first memory interface is an eMNIC interface, and the second memory interface is an SPI interface.

6. The memory sharing dual-mode network communication device according to claim 5, wherein the bridge circuit includes:
 a multiplexer coupled to the NAND slave controller;
 a second memory coupled to the multiplexer;
 a data bus coupled to the multiplexer, the NAND slave controller, and the eMNIC master controller; and
 a confirmation signal line coupled to the memory arbitration circuit, the eMNIC main controller and the NAND slave controller.

7. The memory sharing dual-mode network communication device according to claim 6, wherein the memory arbitration circuit includes a Semaphore module, which is configured to receive, when the PON processor transmits the second access request, a confirmation signal from the NAND slave controller, and determine, according to the operating states of the OTT module and the PON module, whether to response the confirmation signal to allow the PON module to access the PON area.

8. The memory sharing dual-mode network communication device according to claim 7, wherein the Semaphore module further includes a register, which is configured to store a plurality of parameters for determining, according to the operation states of the OTT module and the PON module, the priority order of the first access request and the second access request.

9. The memory sharing dual-mode network communication device according to claim 5, wherein the memory arbitration circuit further includes a register, which is configured to store a plurality of parameters for dividing the first memory into the OTT region and the PON region.

10. The memory sharing dual-mode network communication device according to claim 1, wherein the first memory interface is the same as the second memory interface.

11. The memory sharing dual-mode network communication device according to claim 10, wherein the bridge circuit is a bypass bridge circuit.

12. The memory sharing dual-mode network communication device according to claim 11, wherein the first memory is an MLC NAND memory, the first memory interface is a NAND interface, and the second memory interface is a NAND interface.

13. The memory sharing dual-mode network communication device according to claim 12, wherein the second memory main controller is a first NAND main controller, the memory slave controller is a NAND slave controller, and the first memory main controller is a second NAND main controller.

14. The memory sharing dual-mode network communication device according to claim 1, further comprising a power management module configured to provide an uninterrupted power zone and a power-saving zone, wherein the OTT processor is disposed in the power-saving zone, the first memory main controller, the memory arbitration circuit, the bridge circuit and the memory slave controller are in the uninterrupted power zone, such that when the OTT processor enters a power-saving mode, the first memory host controller, the memory arbitration circuit, the bridge circuit, and the first memory maintain normal operation.

\* \* \* \* \*